(12) United States Patent
Hwang

(10) Patent No.: US 12,738,860 B2
(45) Date of Patent: Sep. 15, 2026

(54) SWITCHING POWER SUPPLY, CONTROLLER THEREFOR AND IMPROVEMENTS THEREOF

(71) Applicant: Champion Microelectronic Corporation, Hsinchu (TW)

(72) Inventor: Jeffrey Hwang, Saratoga, CA (US)

(73) Assignee: Champion Microelectronic Corporation (TW)

( * ) Notice: Subject to any disclaimer, the term of this patent is extended or adjusted under 35 U.S.C. 154(b) by 191 days.

(21) Appl. No.: 18/630,954

(22) Filed: Apr. 9, 2024

(65) Prior Publication Data

US 2024/0348176 A1 Oct. 17, 2024

Related U.S. Application Data

(60) Provisional application No. 63/528,621, filed on Jul. 24, 2023, provisional application No. 63/459,453, filed on Apr. 14, 2023.

(51) Int. Cl.

| | |
|---|---|
| ***H02M 7/217*** | (2006.01) |
| ***H02M 1/00*** | (2006.01) |
| ***H02M 1/42*** | (2007.01) |
| ***H02M 7/219*** | (2006.01) |
| *H02M 3/00* | (2006.01) |

(52) U.S. Cl.

CPC ......... *H02M 7/217* (2013.01); *H02M 1/0009* (2021.05); *H02M 1/4208* (2013.01); *H02M 1/4241* (2013.01); *H02M 7/219* (2013.01); *H02M 3/01* (2021.05)

(58) Field of Classification Search

CPC .. H02M 7/217; H02M 1/0009; H02M 1/4208; H02M 1/4241; H02M 7/219; H02M 3/01; H02M 3/33576; H02M 1/007; H02M 1/4225; H02M 3/33571; Y02B 70/10

See application file for complete search history.

(56) References Cited

U.S. PATENT DOCUMENTS

| | | | | |
|---|---|---|---|---|
| 9,178,439 | B2 * | 11/2015 | Hwang | H02M 1/32 |
| 9,866,108 | B2 * | 1/2018 | Mayell | H02M 1/4225 |
| 10,048,730 | B2 * | 8/2018 | Li | H02M 1/14 |
| 2008/0136342 | A1 * | 6/2008 | Tamegai | H02M 3/33507 315/209 R |
| 2014/0043866 | A1 * | 2/2014 | Zhao | H02M 3/33507 363/21.12 |
| 2016/0322907 | A1 * | 11/2016 | Hwang | H02M 1/36 |
| 2024/0348177 | A1 * | 10/2024 | Hwang | H02M 7/217 |

* cited by examiner

*Primary Examiner* — Kyle J Moody

(74) *Attorney, Agent, or Firm* — Derek J. Westberg, Esq.

(57) ABSTRACT

A switching power supply comprising: a first power supply stage configured to receive an AC input voltage and to generate a DC output voltage, wherein the DC output voltage of the first power supply stage is set to a first target level during a first load condition and, otherwise, the output voltage is set to a second target level, the second target level being higher than the first target level. A level of power provided to a second power supply stage by the first power supply stage may be monitored to determine whether the switching power supply is operating in accordance with the first load condition or the second load condition. A level of the regulated DC output voltage May be adjusted according to a level of power drawn by the switching power converter in order to maintain a switching frequency of the resonant switching converter at or near its resonant frequency.

18 Claims, 6 Drawing Sheets

SWITCHING POWER SUPPLY, CONTROLLER THEREFOR AND IMPROVEMENTS THEREOF

This application claims priority of U.S. Ser. No. 63/459,453, filed Apr. 14, 2023, and U.S. Ser. No. 63/528,621, filed Jul. 24, 2023. The entire contents of the aforementioned applications are hereby incorporated by reference.

BACKGROUND OF THE INVENTION

The present invention relates to the field of switching power supplies.

An off-line power supply receives power from an alternating-current (AC) source and provides a voltage-regulated, direct-current (DC) output that can be used to power a load. An exemplary off-line power supply includes a power factor correction (PFC) stage and a DC-to-DC converter stage. The PFC stage receives the AC input signal, performs rectification and maintains current drawn from the AC source substantially in phase with the AC voltage so that the power supply appears as a resistive load to the AC source. The DC-to-DC converter stage receives the rectified output of the PFC stage and generates the voltage-regulated, DC output which can be used to power the load. The rectified output of the PFC stage is typically at higher voltage and is more loosely regulated than the output of the DC-to-DC stage.

It is desired to provide an improved switching power supply.

SUMMARY OF THE INVENTION

The present invention is directed toward a switching power supply and improvements thereof. In accordance with an embodiment, a switching power supply comprises a first power supply stage configured to receive an AC input voltage and to generate a DC output voltage. The DC output voltage of the first power supply stage is set to a first target level during a first load condition and, otherwise, the output voltage is set to a second target level, the second target level being higher than the first target level. A level of power provided to a second power supply stage by the first power supply stage may be monitored to determine whether the switching power supply is operating in accordance with the first load condition or the second load condition. Adjusting the output voltage of the first power supply stage tends to maintain a switching frequency of the second power supply stage at or near a resonant frequency of the second power supply stage.

In accordance with another embodiment, a controller for switching power supply is provided, The controller comprises a power factor correction controller configured to control a power factor correction circuit arrangement to generate a regulated DC output voltage for provision to a resonant switching converter. The resonant switching converter has a resonant switching frequency. A level of the regulated DC output voltage is adjusted according to a level of power provided to the switching power converter in order to maintain a switching frequency of the resonant switching converter at or near the resonant frequency. A detector circuit arrangement is coupled to the power factor correction controller and configured to detect a level of power drawn by the switching power converter in order to adjust the level of the regulated DC output.

These and other embodiments are described herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

Figure 1:
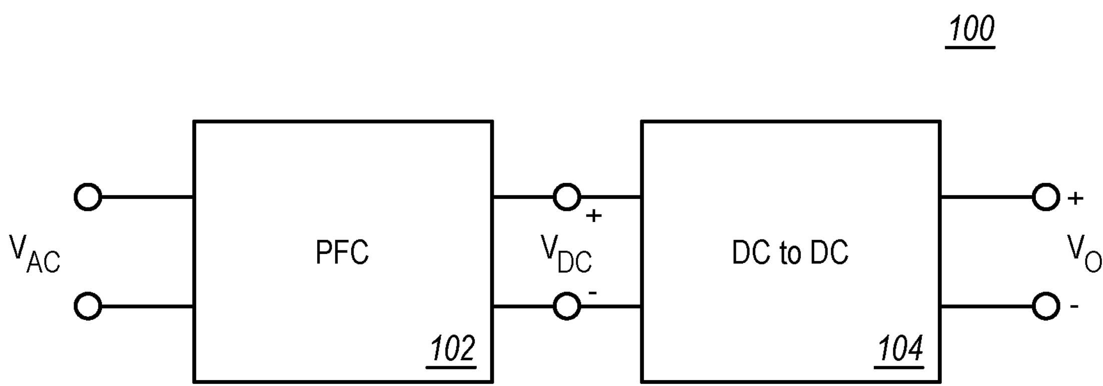
FIG. 1 illustrates a block schematic diagram of a two-stage, off-line power supply in accordance with an embodiment of the present invention.

The present invention is directed towards an improved switching power supply. In accordance with an embodiment, a switching power supply includes at least a first power supply stage, for example, a power factor correction (PFC) stage. The switching power supply may include a second power supply stage, for example, a DC-to-DC converter stage. The first power supply stage is configured to receive an AC voltage as input and to generate a DC output voltage. The second power supply stage receives the DC output voltage of the first power supply stage and generates a further DC output voltage. The DC output voltage of the first power supply stage is set to a first target level during a first load condition and, otherwise the output voltage is set to a second target level. The second target level is higher than the first target level.

The first and second target levels for the DC output voltage of the first power supply stage are dependent upon a level of power drawn by the switching power supply. For example, an error signal is representative of a difference between a current target level for the output voltage of first power supply stage and a monitored level of the output voltage of the first power supply stage. This error signal can be monitored to determine whether the switching power supply is operating in accordance with the first load condition or the second load condition.

The second power supply stage comprises a resonant circuit having a resonant frequency. The first target level causes switching in the second power supply stage to occur at or near the resonant frequency when the level of power reaches a first expected level during the first load condition. The second target level causes switching in the second power supply stage to occur at or near the resonant frequency when the level of power reaches a second expected level during the second load condition. For example, a load coupled to the switching power supply may draw approximately 1000 watts under certain operating conditions (e.g., the first load condition) and may also draw approximately 2000 watts under other operating conditions (e.g., the second load condition). When the load is drawing approximately 1000 watts, the DC output voltage of the first power supply stage is set to a first target level, e.g., 380 volts. To maximize efficiency, the second power supply stage can be configured such that its resonant frequency corresponds to the switching frequency required to regulate its output voltage when the DC output voltage of the first power supply stage is set to 380 volts and the load is drawing 1000 watts. For example, the output voltage of the second power supply stage may be regulated at 12.0 volts DC. However, if the load changes such that it begins drawing 2000 watts, the switching frequency of the second power supply stage will need to change in order to increase the power provided to load while maintaining its output voltage at its regulated level (e.g., at 12.0 volts DC). As a result of this change in switching frequency, efficiency will be reduced. To avoid this, the DC output voltage of the first power supply stage is adjusted (e.g., from 380 volts to 400 volts) when the load changes from 1000 watts to 2000 watts. As a result, the switching frequency can be maintained at or near the resonant frequency which tends to result in improved efficiency.

As described above, the DC output voltage of the first power supply stage has two levels, the first target level (e.g., 380 volts) and the second target level (e.g., 400 volts). In this case, the load power is compared to a threshold to determine which of the two levels should be selected. This two level solution is most effective when the load power also tends to mostly have two levels (e.g., 1000 watts and 2000 watts). In accordance with a further embodiment, the DC output voltage of the first power supply stage may have more than two levels. In this case, the load power may be compared to multiple thresholds in order to determine which target level for the DC output voltage should be selected. In another embodiment, the target level for the DC output voltage may be adjusted over a continuous range of target levels based on the detected load power. In this case, rather than employ one or more thresholds, the target level for the DC output voltage may be continuously adjusted based on monitored changes in the load power thereby increasing efficiency when load power consumption is variable.

FIG. 1 illustrates a block schematic diagram of a two-stage, off-line power supply 100 in accordance with an embodiment of the present invention. As shown in FIG. 1, a first power supply stage 102 has an input coupled to alternating-current (AC) source $V_{AC}$. The first power supply stage 102 can be a power factor correction (PFC) stage. The PFC stage 102 performs rectification on the AC input signal and maintains current drawn from the AC source substantially in phase with the AC voltage so that the power supply 100 appears as a resistive load to the AC source. The PFC stage 102 generates a loosely regulated output voltage, $V_{DC}$.

The output voltage $V_{DC}$ of the PFC stage 102 can be provided as input to a second power supply stage 104. The second power supply stage 104 can be a DC-to-DC converter stage. Using the input $V_{DC}$, the DC-to-DC converter stage 104 generates a voltage-regulated, DC output, $V_O$, which can be used to power a load. The level of $V_{DC}$ is preferably at a higher voltage and can be more loosely regulated than the output $V_O$ of the DC-to-DC converter stage 104. A target level of the output, $V_{DC}$, of the PFC stage 102 may be, for example, approximately 380 volts DC, while the voltage-regulated output $V_O$ of the DC-to-DC converter stage 104 may be, for example, approximately 12.0 volts DC.

Figure 2:
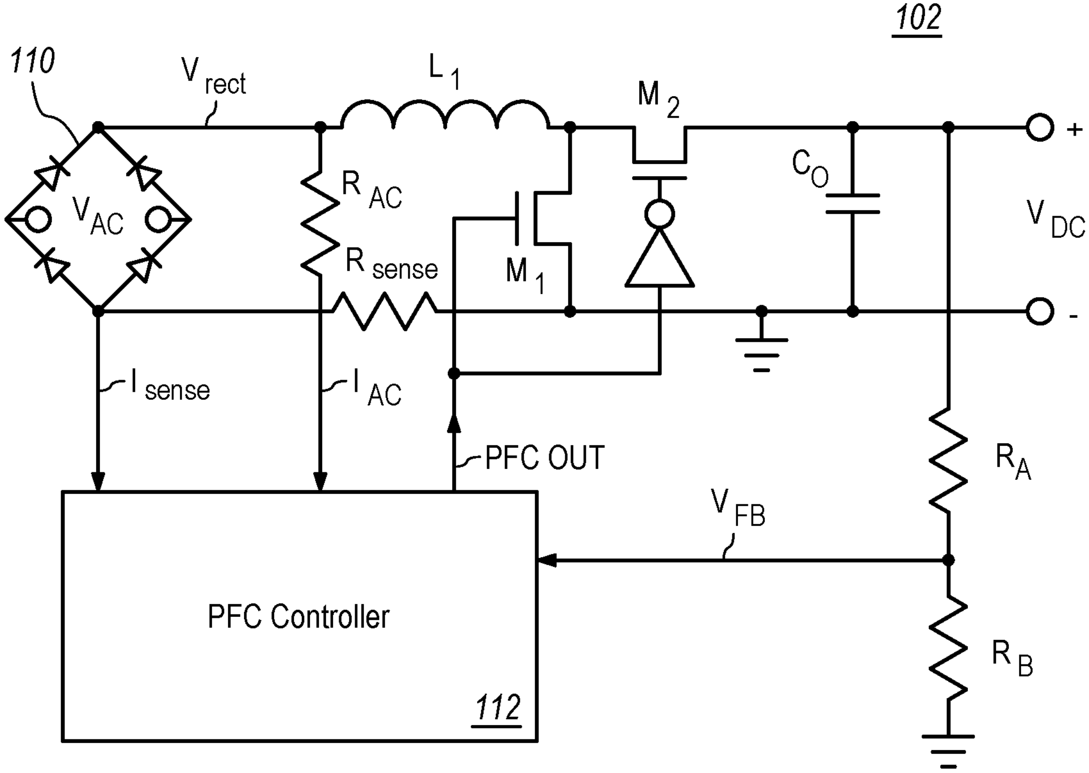
FIG. 2 illustrates a schematic circuit diagram of a power factor correction stage in accordance with an embodiment of the present invention.

FIG. 2 illustrates a schematic circuit diagram of a power factor correction (PFC) stage 102 in accordance with an embodiment of the present invention. An alternating-current (AC) input source $V_{AC}$ is coupled across input terminals of a bridge rectifier 110. A rectified input voltage signal Vrect is formed at a first output terminal of the rectifier 110 and is coupled to a first terminal of a main PFC inductor Li and to a first terminal of a resistor $R_{AC}$. A second terminal of the inductor Li is coupled to a first terminal of a transistor switch $M_1$ and to a first terminal of a transistor switch $M_2$. A second terminal of the switch $M_2$ is coupled to a first terminal of an output capacitor $C_O$. A second terminal of the switch $M_1$ and a second terminal of the capacitor $C_O$ are coupled to a ground node.

A second terminal of the resistor $R_{AC}$ is coupled to a voltage sensing input of a PFC controller 112. An input voltage sensing signal IAC, which is representative of the instantaneous rectified input voltage Vrect, flows through the resistor $R_{AC}$ and is received by the controller 112. A second output terminal of the bridge rectifier 110 is coupled to a current sensing input of the controller 112 and to a first terminal of a resistor Rsense. A second terminal of the resistor Rsense is coupled to the ground node. A current sensing signal Isense, which is representative of the instantaneous current input to the power factor correction stage 102, is formed across the resistor Rsense and is received by the controller 112.

A resistor $R_A$ has a first terminal coupled to the output voltage $V_{DC}$ and a second terminal coupled to a first terminal of resistor $R_B$. A second terminal of the resistor $R_B$ may be coupled a ground node. The resistors $R_A$ and $R_B$ form a voltage divider. An output voltage sensing signal $V_{FB}$ is formed at the node between the resistors $R_A$ and $R_B$. The signal $V_{FB}$ is representative of the output voltage $V_{DC}$.

The PFC controller 112 generates a signal PFC OUT which controls the opening and closing of the switches $M_1$ and $M_2$ so as to regulate the intermediate output voltage $V_{DC}$ while maintaining the input current in phase with the input voltage $V_{AC}$. To accomplish this, the controller 112 uses the signal $V_{FB}$, as well as the input voltage sensing signal IAC and the input current sensing signal Isense. The switches $M_1$ and $M_2$ are generally operated such that when one is opened, the other is closed.

Figure 3:
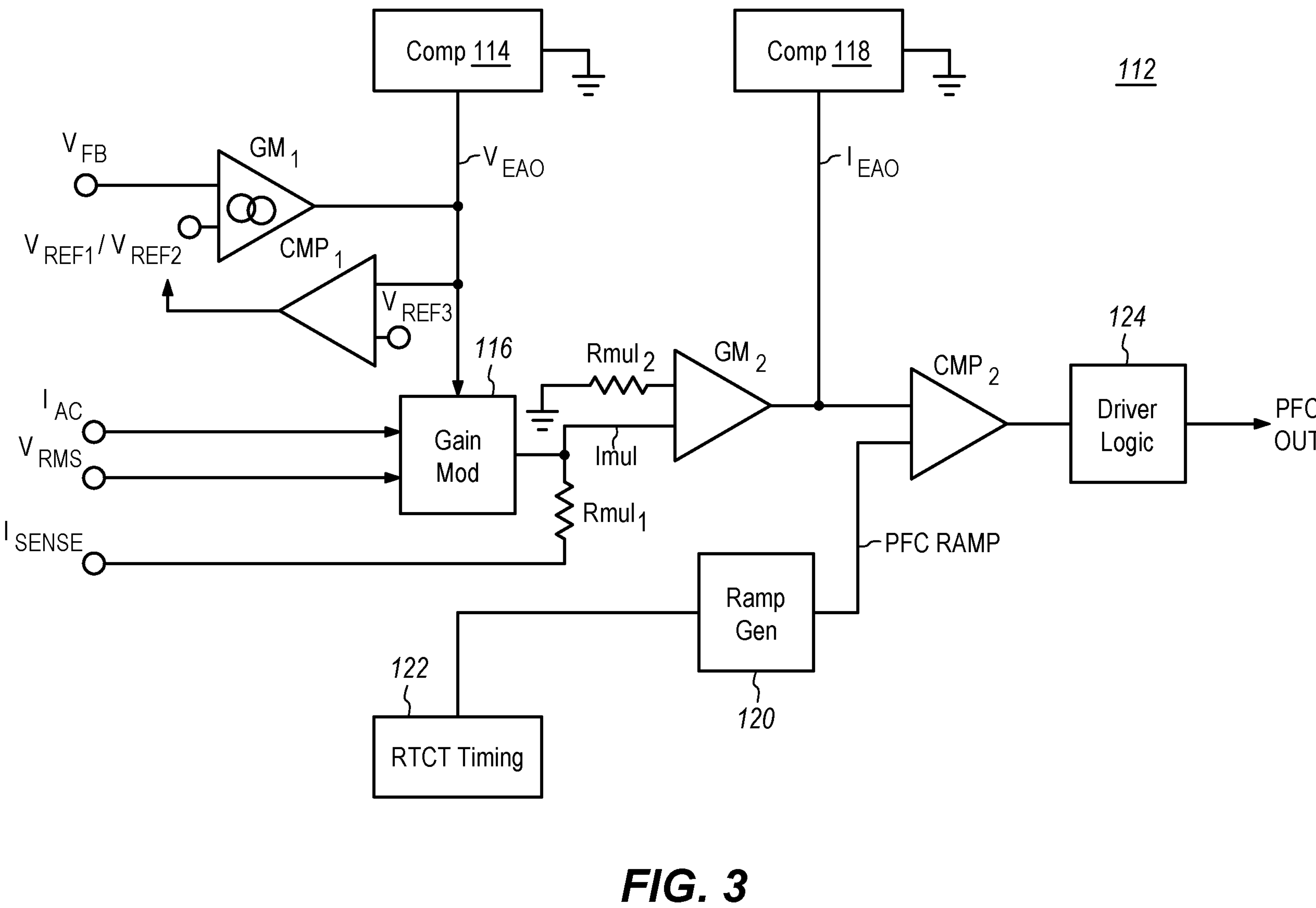
FIG. 3 illustrates a block schematic diagram of a controller for a power factor correction stage and detector in accordance with an embodiment of the present invention.

FIG. 3 illustrates a block schematic diagram of the PFC controller 112 in more detail in accordance with an embodiment of the present invention. Within the controller 112, the signal $V_{FB}$ is coupled to a first input terminal of a transconductance error amplifier $GM_1$. A second input of the error amplifier $GM_2$ is coupled to a reference voltage that is representative of a desired level for the output voltage $V_{DC}$. This reference voltage may be a fixed value $V_{REF1}$ Or $V_{REF2}$, depending upon the output level of a comparator $CMP_1$. An output of the error amplifier $GM_1$ forms a signal $V_{EAO}$, which is an error signal that is representative of a difference between the actual level of the output voltage $V_{DC}$ and a desired level for the output voltage. As shown in FIG. 3, the error signal $V_{EAO}$ is formed across a compensation circuit 114.

In an embodiment, the level of the reference voltage $V_{REF1}$ corresponds to a target level of approximately 380 volts DC for the PFC output $V_{DC}$, while the level of the reference voltage $V_{REF2}$ corresponds to a target level of approximately 400 volts DC for the PFC output $V_{DC}$. It will be apparent that different levels for the PFC output $V_{DC}$ can be selected, for example, by changing the values of the reference voltage levels $V_{REF1}$ and $V_{REF2}$ applied to the error amplifier $GM_1$.

In an embodiment, the comparator $CMP_1$ determines whether the PFC circuit 102 is operating under a first load condition or a second load conditions (i.e. loading conditions other than the first load condition) according to the level of the error signal $V_{EAO}$. For example, when the level of the error signal $V_{EAO}$ is less than a voltage reference $VREF_3$, this indicates the first load condition; in this case, the output of the comparator $CMP_1$ may be a logic low voltage. If the level of the error signal $V_{EAO}$ exceeds $VREF_3$, this indicates the second load condition; in this case, the output of the comparator $CMP_1$ may be a logic high voltage. In an embodiment, the voltage reference $VREF_3$ may be set to 1.0 volts.

The output of the comparator $CMP_1$ determines whether the reference voltage $V_{REF1}$ or the reference voltage $V_{REF2}$ is applied to the error amplifier $GM_1$. Thus, the level at which $V_{DC}$ is regulated by the PFC stage 102 can be different depending upon the loading.

Changing from a first target level for the output $V_{DC}$ to a second target level, and vice versa, can result in a sudden change in the target level for the output $V_{DC}$. In an embodiment, once the output of the comparator $CMP_1$ is changed, the reference voltage applied to the error amplifier $GM_1$ is preferably not changed again (i.e. from $V_{REF1}$ to $V_{REF2}$ and vice versa) at least until the actual output voltage approaches the new target level. This can be accomplished, for example, by avoiding changing the target level again for a predetermined time period after a change or by avoiding changing the target level again until the error signal falls below a threshold after a change. Such a delay can help to prevent unstable operation. Such a delay can be implemented, for example, by a timer circuit within the comparator $CMP_1$ which prevents its output from changing for a predetermined time after each change or by requiring $V_{EAO}$ to fall below or rise above $VREF_3$ by a hysteresis margin after each change in output of the comparator $CMP_1$.

As described above, the DC output voltage of the first power supply stage has two levels, the first target level (e.g., 380 volts) and the second target level (e.g., 400 volts). Alternatively, the reference voltage applied to the second input of the error amplifier $GM_1$ can have multiple levels or can be a variable value dependent upon, for example, the level of the error signal $V_{EAO}$. Employing multiple levels can be accomplished, for example, by replacing the comparator $CMP_1$ with an analog-to-digital converter that is configured to convert the level of $V_{EAO}$ to a digital value where the digital value is used to select the reference voltage level from among a plurality of reference voltage levels for coupling to the second input of the error amplifier $GM_1$.

A gain modulation block 116 receives the error signal $V_{EAO}$ as well as the signal IAC for generating a modulated error signal Imul. The gain modulation block 116 can, optionally, also receive the signal $V_{RMS}$. The signal $V_{RMS}$ is representative of the level of the AC line voltage and can be used to inhibit switching in the PFC stage 102, by gradually pulling down the level of the signal Imul, for example, if the AC line voltage is too low for an extended period (i.e. under "brown out" conditions). The signal $V_{RMS}$ can be generated, for example, by applying the signal IAC, which represents an instantaneous value of the input voltage $V_{AC}$, to a filter that generates signal $V_{RMS}$ by averaging value of IAC over at least one cycle of the AC input voltage $V_{AC}$.

The output of the gain modulation block 116 is coupled to a first input terminal of a transconductance amplifier $GM_2$ and to a first terminal of a resistor $Rmul_1$. A second terminal of the resistor $Rmul_1$ is coupled to receive the signal Isense. A first terminal of a resistor $Rmul_2$ is coupled to a second input terminal of the amplifier $GM_2$. A second terminal of a resistor $Rmul_2$ is coupled to a ground node.

An output of the amplifier $GM_2$ is coupled to a compensation circuit 118. A signal $I_{EAO}$ is formed at the output of the amplifier $GM_2$. The signal $I_{EAO}$ is representative of the error signal $V_{EAO}$ as well as the input voltage and input current to the PFC stage. The signal $I_{EAO}$ is coupled to a first input of a comparator $CMP_2$. An output of a ramp generator 120 forms a ramp signal PFC RAMP which is coupled to a second terminal of the comparator $CMP_2$. An RTCT node of the ramp generator 120 is coupled to an RTCT timing network 122 which sets the frequency of the ramp signal.

The signal $I_{EAO}$ functions to implement a first feedback loop which equalizes the signals IAC and ISENSE in order to maintain the input voltage Vrect in phase with the input current IAC. This first feedback loop includes the signals IAC and ISENSE, as well as the gain modulation block 116, resistors $Rmul_1$ and $Rmul_2$, and transconductance amplifier $GM_2$. As a result, the PFC converter appears to the AC input source as a resistive (i.e. non-reactive) load. The signal $I_{EAO}$ also functions to implement a second feedback loop which regulates the output voltage $V_{DC}$ at its desired level. This second feedback loop includes the signals $V_{FB}$ and $V_{REF1}$ (or $V_{REF2}$) as well as the gain modulation block 116 and transconductance amplifiers $GM_1$ and $GM_2$ An output of the comparator $CMP_2$ is coupled to driver/logic block 124 which includes driver and logic circuit elements for forming the PFC switching signal PFC OUT. The signal PFC OUT controls the transistor switches $M_1$ and $M_2$ of the PFC stage 102 (FIGS. 1-2) of the switching power supply 100 (FIG. 1). It will be apparent that the PFC function and control of switching in the PFC stage 102 as shown in FIG. 3 can be accomplished in other ways and by employing different circuit arrangements.

Figure 4:
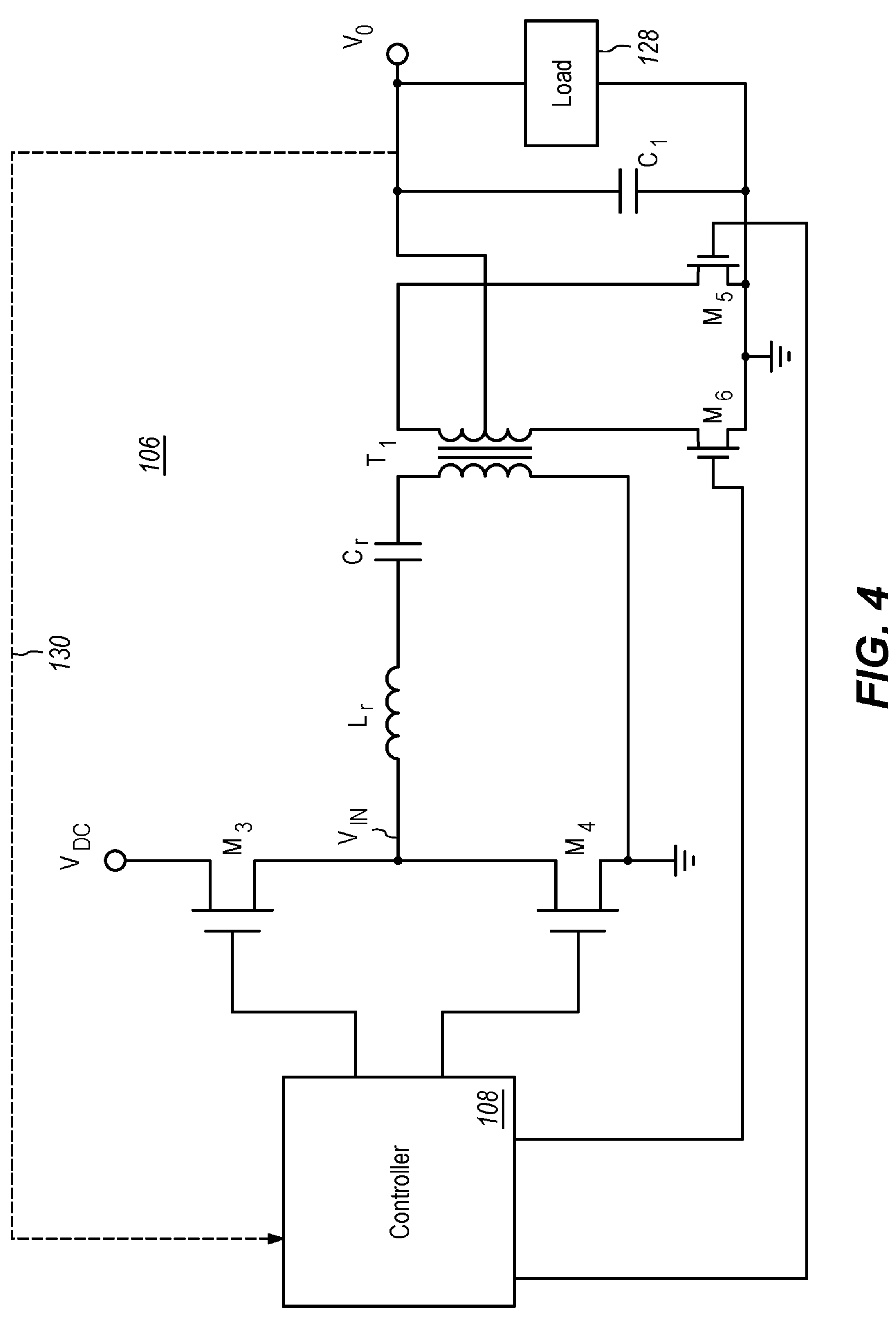
FIG. 4 illustrates a schematic circuit diagram of a DC-to-DC converter stage in accordance with an embodiment of the present invention.

FIG. 4 illustrates a schematic diagram of a resonant switching converter 106 in accordance with an embodiment of the present invention. The resonant switching converter 106 may be, for example, included in the DC-to-DC converter 104 of FIG. 1. Referring to FIG. 4, the converter 106 includes a half-bridge switching inverter that includes a pair of series-connected transistor switches $M_3$ and $M_4$. A power source, such as the output $V_{DC}$ generated by the PFC stage 102 (FIG. 1), is coupled to a first terminal of the transistor switch $M_3$. A second terminal of the transistor switch $M_3$ is coupled to a first terminal of a transistor switch $M_4$ to form an intermediate node. The second terminal of the transistor switch $M_4$ is coupled to a ground node. Control terminals of each of the transistor switches $M_3$ and $M_4$ are coupled to a controller 108. The controller 108 controls opening and closing of the pair of transistor switches $M_3$ and $M_4$. The switches $M_3$ and $M_4$ are generally operated such that when one is opened, the other is closed. When the switch $M_3$ is closed and the switch $M_4$ is open, the intermediate node is coupled to $V_{DC}$. This raises a voltage, VIN, at the intermediate node. When the switch $M_3$ is open and the switch $M_4$ is closed, the intermediate node is coupled to ground. This lowers the voltage, VIN, at the intermediate node.

Energy storage elements are coupled to the intermediate node. Particularly, as shown in FIG. 4, a first terminal of an inductor $L_r$ is coupled to the intermediate node. A second terminal of the inductor $L_r$ is coupled to a first terminal of a capacitor $C_r$. The energy storage elements, $L_r$ and $C_r$, form a series resonant tank. The resonant tank is charged with energy by raising and lowering the voltage VIN at the intermediate node. A second terminal of the capacitor $C_r$ is coupled to a first terminal of a primary winding of a transformer $T_1$. A second terminal of the primary winding of the transformer $T_1$ is coupled to a ground node. A first terminal of a secondary winding of the transformer $T_1$ is coupled to a first terminal of a transistor switch $M_5$. A second terminal of the secondary winding of the transformer $T_1$ is coupled to a first terminal of a transistor switch $M_6$. A second terminal of the transistor switch $M_5$ and a second terminal of the transistor switch $M_6$ are coupled to a ground node. Control terminals of each of the transistor switches $M_5$ and $M_6$ are coupled to the controller 108. The controller 108 controls opening and closing of the transistor switches $M_5$ and $M_6$ synchronously with transistor switches $M_3$ and $M_4$.

A center tap of the secondary winding of the transformer $T_1$ is coupled to a first terminal of a capacitor $C_1$. A second terminal of the capacitor $C_1$ is coupled to a ground node. An output voltage, $V_O$, is formed across the capacitor $C_1$. A load 110 may be coupled across the capacitor $C_1$ to receive the output voltage $V_O$. The output voltage $V_O$, or a voltage that is representative of the output voltage, is fed back to the controller 128 via a feedback path 130.

Adjusting the switching frequency of the transistor switches $M_3$, $M_4$, $M_5$ and $M_6$ adjusts impedance of the resonant tank and, therefore, adjusts the amount of power delivered to the load 128. More particularly, decreasing the switching frequency tends to increase the power delivered to the load 128. Increasing the switching frequency tends to reduce the power delivered to the load 128. By monitoring the level of the output voltage $V_O$ via a feedback path 130, the controller 108 can adjust the switching frequency to maintain the output voltage $V_O$ constant despite changes in the power requirements of the load 128 and despite changes in the level of the input $V_{DC}$. This is referred to as frequency modulation or FM modulation. In an embodiment, the output voltage $V_O$ is regulated at a level of 12.0 volts DC, however, it will be apparent that some other output voltage level can be selected. While FIG. 4 shows a half-bridge switching inverter, it can be replaced with a full-bridge switching inverter or with some other DC-to-DC converter topology.

Figure 5:
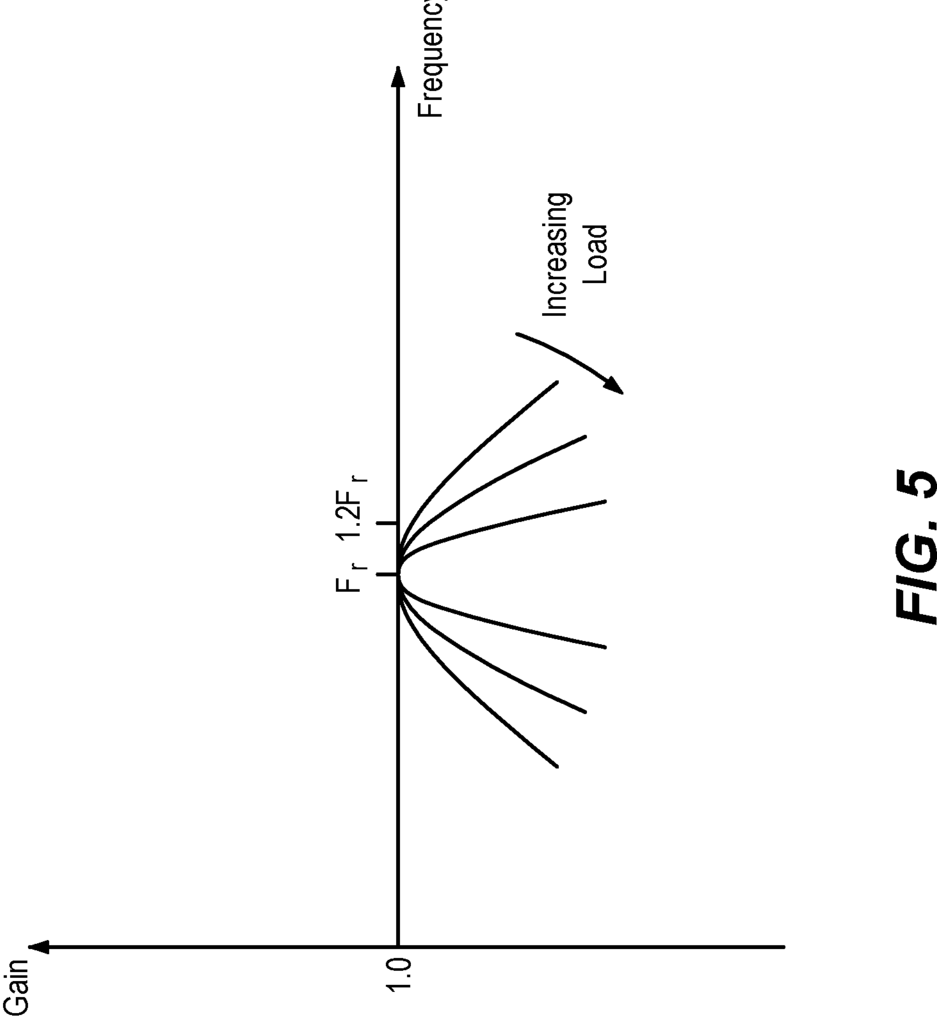
FIG. 5 illustrates a graph showing a relationship between switching frequency and gain for a resonant DC-to-DC converter stage in accordance with an embodiment of the present invention.

FIG. 5 illustrates a graph showing a relationship between switching frequency and gain for a resonant DC-to-DC converter stage in accordance with an embodiment of the present invention. The resonant frequency for the DC-to-DC converter is shown in FIG. 5 as Fr. The value of Fr is dependent upon the values of the main resonant components of the resonant DC-to-DC converter which include the values of the inductor $L_r$, the capacitor $C_r$ and the inductance of the primary winding of the transformer $T_1$ (FIG. 4). The gain of the converter is related to a ratio of the converter input voltage (i.e. the PFC output $V_{DC}$) and the converter output voltage. The maximum gain as shown in FIG. 5 is 1.0. FIG. 5 also shows a series of gain vs. frequency curves, each of which depicts a particular load level. Maximum efficiency for the resonant DC-to-DC converter occurs when the switching frequency is at or near the resonant frequency and, more particularly, when the switching frequency is in the range of Fr to 1.2 times Fr and when the switching duty cycle is approximately 50%. It is therefore desired to maintain the operating point within the range of Fr to 1.2 times Fr and duty cycle is approximately 50%. As load power increases, current levels within the resonant converter increase as do parasitic losses due to increased current. Accordingly, the gain vs. frequency curves show that gain falls off with increasing switch frequency more dramatically as the load increases. It is therefore desirable to increase converter input voltage at higher load power levels in order to maintain maximum efficiency.

Figure 6:
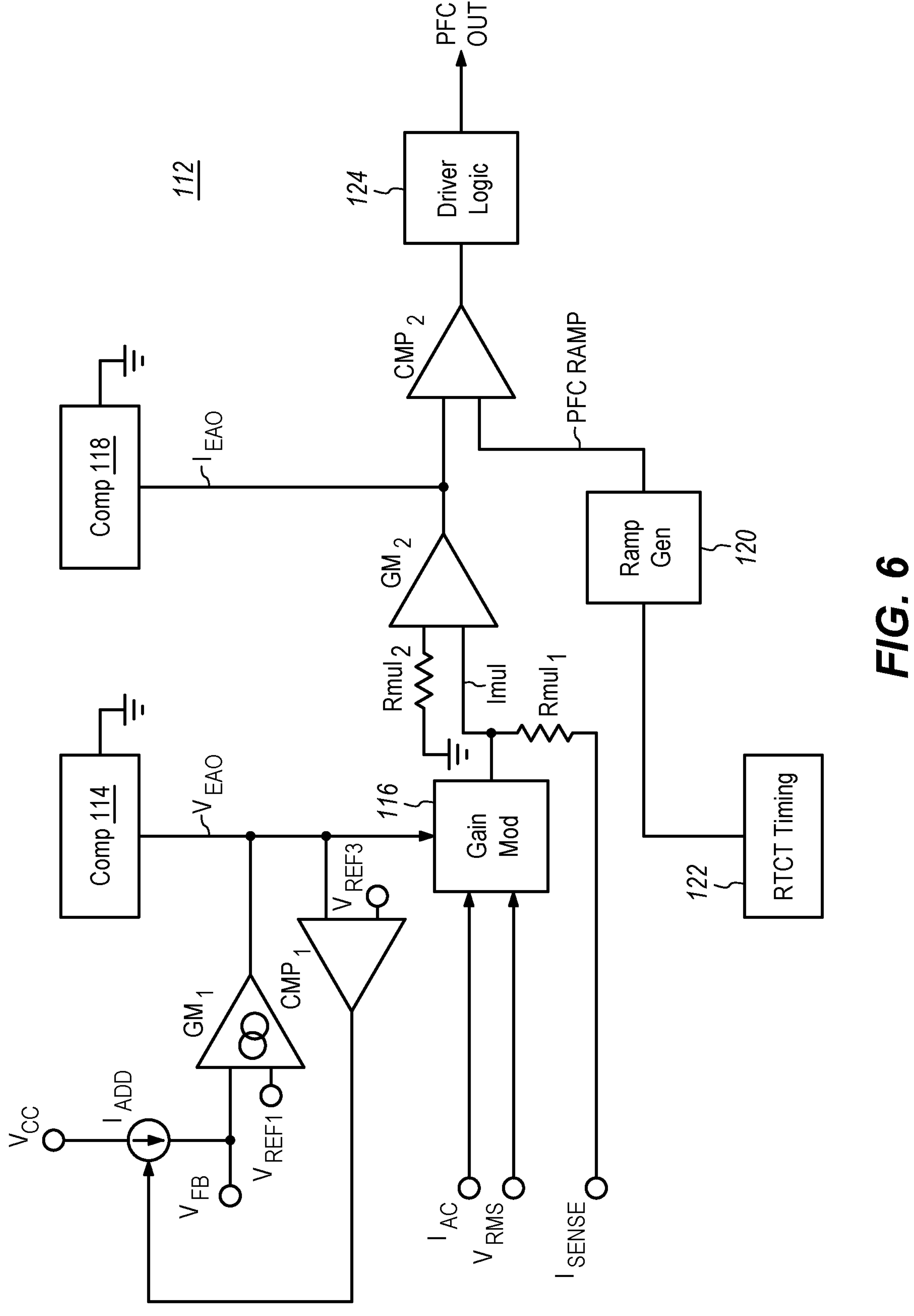
FIG. 6 illustrates a block schematic diagram of an alternative embodiment of a controller for a power factor correction stage and detector in accordance with an embodiment of the present invention.

FIG. 6 illustrates a block schematic diagram of an alternative embodiment of a controller for a power factor correction stage and detector in accordance with an embodiment of the present invention. FIG. 6 shares many of the same components and functions as are depicted in FIG. 3 discussed above. Therefore, only differences between FIGS. 3 and 6 are discussed here. Specifically, in FIG. 6, the reference voltage $V_{REF2}$ is omitted while the reference voltage $V_{REF1}$ remains coupled to the second input of the transconductance amplifier $GM_1$. Rather than select between the reference voltages $V_{REF1}$ and $V_{REF2}$ as in FIG. 3, the output of the comparator $CMP_1$ selectively activates a current source $I_{ADD}$. The current source $I_{ADD}$ may have a value of approximately 3 uA (microamps). Activating the current source $I_{ADD}$ has the effect of increasing the target level for the PFC output $V_{DC}$. In an embodiment, the level of the reference voltage $V_{REF1}$ corresponds to a first target level (e.g., 380 volts DC) for the PFC output $V_{DC}$, while activating the current source $I_{ADD}$ corresponds to a second target level (e.g. 400 volts DC) for the PFC output $V_{DC}$. As described above in connection with FIG. 6, the DC output voltage of the first power supply stage has two levels, the first target level (e.g., 380 volts) and the second target level (e.g., 400 volts). Alternatively, the current source $I_{ADD}$ can be a variable value dependent upon, for example, the level of the error signal $V_{EAO}$. In this case, the target level for the DC output voltage may be adjusted over a continuous range of target levels based on the detected load power.

Figure 7:
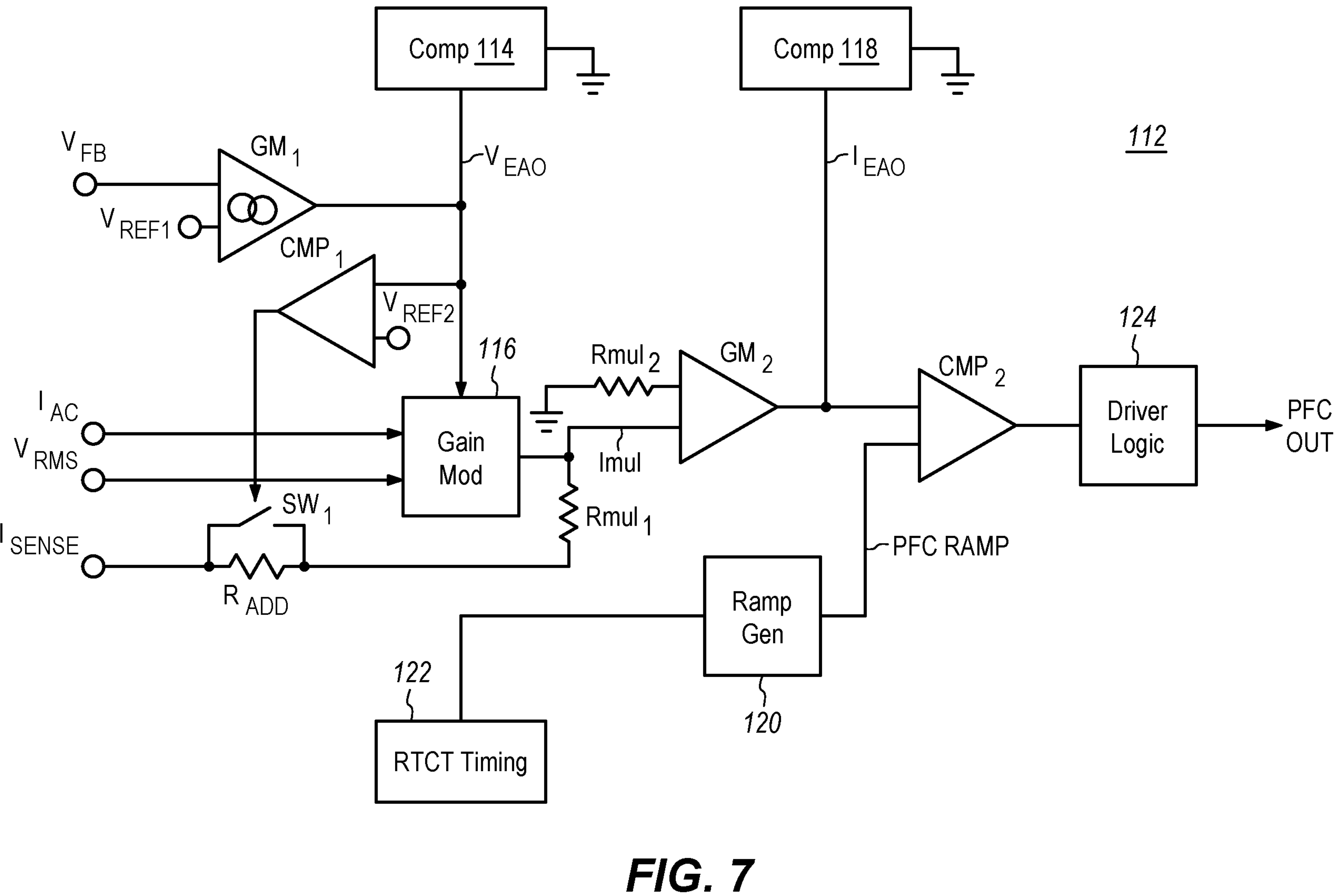
FIG. 7 illustrates a block schematic diagram of an alternative embodiment of a controller for a power factor correction stage and detector in accordance with an embodiment of the present invention.

FIG. 7 illustrates a block schematic diagram of an alternative embodiment of a controller for a power factor correction stage and detector in accordance with an embodiment of the present invention. FIG. 7 shares many of the same components and functions as are depicted in FIG. 3 discussed above. Therefore, only differences between FIGS. 3 and 7 are discussed here. Specifically, in FIG. 7, the reference voltage $V_{REF2}$ is omitted while the reference voltage $V_{REF1}$ remains coupled to the second input of the transconductance amplifier $GM_1$. Rather than select between the reference voltages $V_{REF1}$ and $V_{REF2}$ as in FIG. 3, the output of the comparator $CMP_1$ selectively adds a resistance $R_{ADD}$ in series with the resistor $Rmul_1$ by activating a switch $SW_1$. Activating the switch $SW_1$ has the effect of increasing the target level for the PFC output $V_{DC}$. In an embodiment, the level of the reference voltage $V_{REF1}$ corresponds to a first target level (e.g., 380 volts DC) for the PFC output $V_{DC}$, while activating the switch $SW_1$ corresponds to a second target level (e.g. 400 volts DC) for the PFC output $V_{DC}$. As described above in connection with FIG. 7, the DC output voltage of the first power supply stage has two levels, the first target level (e.g., 380 volts) and the second target level (e.g., 400 volts). Alternatively, the resistance $R_{ADD}$ can have a variable value dependent upon, for example, the level of the error signal $V_{EAO}$. In this case, the target level for the DC output voltage may be adjusted over a continuous range of target levels based on the detected load power.

The foregoing detailed description of the present invention is provided for the purposes of illustration and is not intended to be exhaustive or to limit the invention to the embodiments disclosed. Accordingly, the scope of the present invention is defined by the appended claims and any amendments thereto.

What is claimed is:

1. A controller for a switching power supply, the controller comprising:

a power factor correction controller configured to control a power factor correction circuit arrangement to generate a regulated DC output voltage for provision to a resonant switching converter having a resonant switching frequency, wherein the controller for the switching power supply is configured to adjust a level of the regulated DC output voltage according to a level of power provided to the resonant switching converter in order to maintain a switching frequency of the resonant switching converter at or near the resonant frequency; and a detector circuit arrangement coupled to the power factor correction controller and configured to detect a level of power drawn by the resonant switching converter in order to adjust the level of the regulated DC output, wherein the controller for the switching power supply is configured to monitor an input current supplied to the power factor correction circuit arrangement to modulate switching of the power factor correction circuit arrangement and further wherein the controller for the switching supply is configured to adjust the level of the regulated DC output voltage by adjusting a resistance value used to monitor the input current.

2. The controller according to claim 1, wherein the power factor correction circuit arrangement is configured to generate an error signal wherein the error signal is representative of a difference between a current target level for the regulated DC output voltage and a monitored level of the DC output voltage.

3. The controller according to claim 2, wherein the detector circuit arrangement is configured to monitor the error signal for detecting the level of power drawn by the resonant switching converter.

4. The controller according to claim 3, wherein the detector circuit arrangement comprises a hysteresis comparator configured to compare the error signal to a reference voltage level.

5. The controller according to claim 1, further comprising a first power supply stage configured to generate the regulated DC output voltage and further comprising a second power supply stage configured to receive the DC output voltage from the first power supply stage and the second power supply stage being configured to generate a DC output voltage for the second power supply stage.

6. The controller according to claim 1, wherein the resistance value used to monitor the input current is continuously variable.

7. A controller for a switching power supply, the controller comprising:

a power factor correction controller configured to control a power factor correction circuit arrangement to generate a regulated DC output voltage for provision to a resonant switching converter having a resonant switching frequency, wherein the controller for the switching power supply is configured to adjust a level of the regulated DC output voltage according to a level of power provided to the resonant switching converter in order to maintain a switching frequency of the resonant switching converter at or near the resonant frequency, wherein the power factor correction circuit arrangement is configured to generate an error signal wherein the error signal is representative of a difference between a current target level for the regulated DC output voltage and a monitored level of the DC output voltage; and a detector circuit arrangement coupled to the power factor correction controller and configured to detect a level of power drawn by the resonant switching converter in order to adjust the level of the regulated DC output, wherein the controller for the switching power supply is configured to generate the error signal by a transconductance amplifier and to use the error signal to modulate switching of the power factor correction circuit arrangement and further wherein the controller for the switching power supply is configured adjust to the level of the regulated DC output voltage by activating a current source coupled to the transconductance amplifier.

8. The controller according to claim 7, wherein the detector circuit arrangement is configured to monitor the error signal for detecting the level of power drawn by the resonant switching converter.

9. The controller according to claim 7, wherein the detector circuit arrangement comprises a hysteresis comparator configured to compare the error signal to a reference voltage level.

10. The controller according to claim 7, further comprising a first power supply stage configured to generate the regulated DC output voltage and further comprising a second power supply stage configured to receive the DC output voltage from the first power supply stage and the second power supply stage being configured to generate a DC output voltage for the second power supply stage.

11. The controller according to claim 7, wherein the current source coupled to the transconductance amplifier is continuously variable.

12. A controller for a switching power supply, the controller comprising:

a power factor correction controller configured to control a power factor correction circuit arrangement to generate a regulated DC output voltage for provision to a resonant switching converter having a resonant switching frequency, wherein the controller for the switching power supply is configured to adjust a level of the regulated DC output voltage according to a level of power provided to the resonant switching converter in order to maintain a switching frequency of the resonant switching converter at or near the resonant frequency; and a detector circuit arrangement coupled to the power factor correction controller and configured to detect a level of power drawn by the resonant switching converter in order to adjust the level of the regulated DC output, wherein the controller for the switching power supply is configured to monitor an input current supplied to the power factor correction circuit arrangement to modulate switching of the power factor correction circuit arrangement and further wherein the controller for the switching power supply is configured to adjust the level of the regulated DC output voltage over a continuous range of target levels based on the detected level of power.

13. The controller according to claim 12, wherein the power factor correction circuit arrangement is configured to generate an error signal wherein the error signal is representative of a difference between a current target level for the regulated DC output voltage and a monitored level of the DC output voltage.

14. The controller according to claim 13, wherein the detector circuit arrangement is configured to monitor the error signal for detecting the level of power drawn by the resonant switching converter.

15. The controller according to claim 14, wherein the detector circuit arrangement comprises a hysteresis comparator configured to compare the error signal to a reference voltage level.

16. The controller according to claim 12, further comprising a first power supply stage configured to generate the regulated DC output voltage and further comprising a second power supply stage configured to receive the DC output voltage from the first power supply stage and the second power supply stage being configured to generate a DC output voltage for the second power supply stage.

17. The controller according to claim 12, being configured to adjust the level of the regulated DC output voltage by activating a current source coupled to the transconductance amplifier and wherein the current source is continuously variable.

18. The controller according to claim 12, being configured to adjust the level of the regulated DC output voltage by adjusting a resistance value used to monitor the input current and wherein the resistance value is continuously variable.

* * * * *